(12) United States Patent
Liu et al.

(10) Patent No.: US 7,291,949 B2
(45) Date of Patent: Nov. 6, 2007

(54) MOUNTING STRUCTURE FOR MOTOR CONTROLLER OF HEAT-DISSIPATING DEVICE

(75) Inventors: Cheng-Chieh Liu, Taoyuan Hsien (TW); Yi-Fang Chou, Taoyuan Hsien (TW); Tsu-Liang Lin, Taoyuan County (TW); Ming-Shi Tsai, Taoyuan Hsien (TW); Kuo-Cheng Lin, Taoyuan Hsien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 0 days.

(21) Appl. No.: 10/772,322

(22) Filed: Feb. 6, 2004

(65) Prior Publication Data

US 2005/0029882 A1    Feb. 10, 2005

(30) Foreign Application Priority Data

Aug. 6, 2003    (TW) .............................. 92214273 U

(51) Int. Cl.
*H02K 7/00*    (2006.01)
(52) U.S. Cl. ................................. 310/68 B; 310/67 R
(58) Field of Classification Search ............. 310/68 B, 310/91, 67 R, 68 R, 64; 324/207.2
See application file for complete search history.

(56) References Cited

U.S. PATENT DOCUMENTS

| | | | |
|---|---|---|---|
| 4,099,104 A * | 7/1978 | Muller ........................ | 318/138 |
| 4,115,715 A * | 9/1978 | Muller ........................ | 310/68 B |
| 4,482,849 A * | 11/1984 | Doemen et al. ............. | 318/254 |
| 4,554,473 A * | 11/1985 | Muller ........................ | 310/67 R |
| 4,800,307 A * | 1/1989 | Papst ........................ | 310/67 R |
| 4,818,907 A * | 4/1989 | Shirotori .................... | 310/67 R |
| 4,910,420 A * | 3/1990 | Hoover et al. ............. | 310/68 B |
| 4,952,830 A * | 8/1990 | Shirakawa .................. | 310/68 B |
| 5,233,295 A * | 8/1993 | Murata et al. ............. | 324/207.2 |
| 5,581,179 A * | 12/1996 | Engel et al. ............... | 324/207.2 |
| 5,596,271 A * | 1/1997 | Lowery ..................... | 324/174 |
| 5,825,108 A * | 10/1998 | De Filippis ................ | 310/67 R |
| 5,969,445 A * | 10/1999 | Horiuchi et al. ............ | 310/64 |
| 6,021,043 A * | 2/2000 | Horng ........................ | 361/695 |
| 6,396,259 B1 * | 5/2002 | Washeleski et al. ... | 324/207.22 |
| 6,462,443 B2 * | 10/2002 | Horng ........................ | 310/68 B |

FOREIGN PATENT DOCUMENTS

JP    63-039448    *    2/1988

* cited by examiner

*Primary Examiner*—Dang Le
(74) *Attorney, Agent, or Firm*—Birch, Stewart, Kolasch & Birch, LLP

(57) ABSTRACT

A modified mounting structure for a heat-dissipating device. The heat-dissipating device has a motor and a seat with a slot mounted on a base or the cover portion of a stator thereof. The seat secures a motor controller of the heat-dissipating device detecting phase changes of the magnetic poles of the motor. The structure of a heat-dissipating device reduces required components, manufacturing cost and assembly time, and the control circuit is greatly simplified.

16 Claims, 6 Drawing Sheets

MOUNTING STRUCTURE FOR MOTOR CONTROLLER OF HEAT-DISSIPATING DEVICE

This Nonprovisional application claims priority under 35 U.S.C. § 119(a) on patent application Ser. No(s). 092214276 filed in TAIWAN on Aug. 6, 2003, the entire contents of which are hereby incorporated by reference.

BACKGROUND OF THE INVENTION

1. Field of the Invention

The present invention relates to a container for a motor controller of a heat-dissipating device, and in particular to a motor controller and a container for a DC brushless motor in a heat-dissipating device.

2. Description of the Related Art

DC brushless motors are used in many electronic devices, such as heat-dissipating fans. FIG. 1A shows a conventional fan using a DC brushless motor. In FIG. 1A, the fan includes a frame 11, a printed circuit board 12 (PCB), a stator 13, and a rotor 14. When assembling the fan, the PCB 12, stator 13 and rotor 14 are sequentially assembled to a sleeve 111 on a base portion of the frame 11.

Unlike a conventional DC motor, a brushless DC motor includes a Hall sensor to detect the phase change of magnetic field and a driving circuit to convert current direction in the stator winding, rather than the brushes used in the conventional DC motor. The converted current in the stator winding induces a magnetic field to drive the rotor. The Hall sensor in the conventional DC brushless motor is generally disposed on a PCB. In FIG. 1A, the pins of the Hall sensor 15 are surface-mounted on the relative contacts on the bottom surface 121 of the PCB 12, and the Hall sensor 15 is then bent upward, extending into the stator 13.

FIG. 1B shows another structure to fix a Hall sensor on a PCB of the conventional DC brushless motor. In FIG. 1B, a plurality of holes 16 are formed on the PCB 12. The pins 151 of the Hall sensor 12 pass through the holes 15 and are soldered to the bottom surface of the PCB 12.

The circuit of the above conventional mounting methods for Hall sensors is, however, complicated, which reduces available layout area on the PCB and increases fabricating cost. The complicated layout on the PCB also increases impedance and causes considerable power loss. Moreover, since the Hall sensors are not consistently bent to predetermined angles during fabrication, their position corresponding to the position of the magnetic poles will be easily displaced resulting from externally careless collision.

Hence, there is a need for a better DC brushless motor with lower cost, precise angling of a Hall sensor and precise speed control.

SUMMARY OF THE INVENTION

Accordingly, an object of the invention is to provide an integrated motor controller for a DC brushless motor. The integrated motor controller controls and drives the DC brushless motor to replace the conventional complicated PCB.

Another object of the invention is to provide an improved mounting structure for the above integrated motor controller, reducing cost and fabrication complexity, whereby the fan can be precisely controlled.

The present invention provides a modified structure of a heat-dissipating device with a container to secure the motor controller thereof. The container is fixed on a chassis of the heat-dissipating device and includes a slot to hold the motor controller.

The container of the present invention is a substantially square container. The slot is shaped according to the profile of the motor controller and formed in the central portion of the container. The container has at least one hook to fix the container on the chassis of the heat-dissipating device.

In a preferred embodiment, the container is formed by a plurality of positioning pillars. The positioning pillars have U-shaped cross sections respectively and are separated according to the profile of the motor controller.

The container is mounted on, adhered to, or integrally formed on the chassis.

The present invention also provides a heat-dissipating device including a frame with a chassis, a stator disposed on the chassis and a rotor surrounding the stator coupling thereof. A container is fixed on the chassis and has a slot securing the motor controller to drive and control the heat-dissipating device.

The motor controller has a plurality of pins with broadened contacts to which a plurality of wires of an external device are connected. Furthermore, the motor controller is an integrated circuit, controlling the heat-dissipating device and detecting phase change of the magnetic field around the stator.

The present invention provides another heat-dissipating device including a frame with a chassis, a stator disposed on the chassis and a rotor surrounding the stator coupling thereof. A container is fixed on the stator and has a slot securing the motor controller.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

The present invention provides a modified structure of a heat-dissipating fan with a container for a motor controller thereof. The heat-dissipating fan has an integrated motor controller, such as an integrated circuit (IC) combining motor driving circuits and a Hall sensor to detect the phase change of magnetic poles and drive the motor thereof. The integrated motor controller can also control the motor according to the detected phase change through a pre-set control application.

Figure 1A:
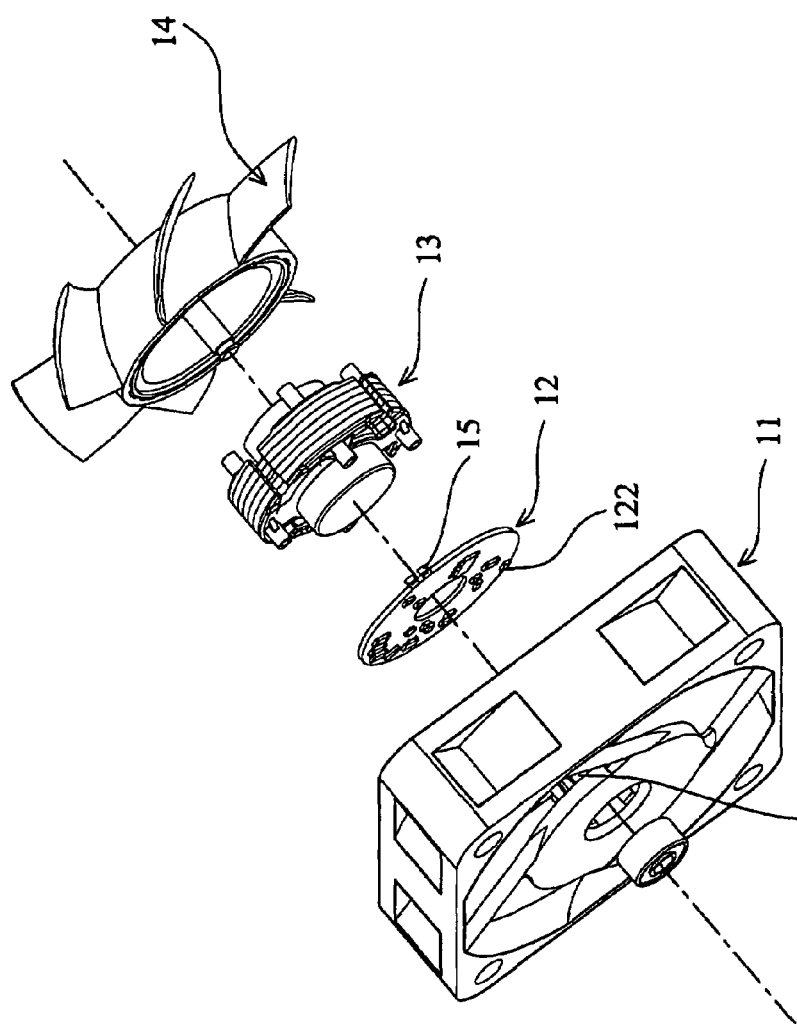
FIG. 1A is an exploded view of a conventional fan using a DC brushless motor.
Figure 1B:
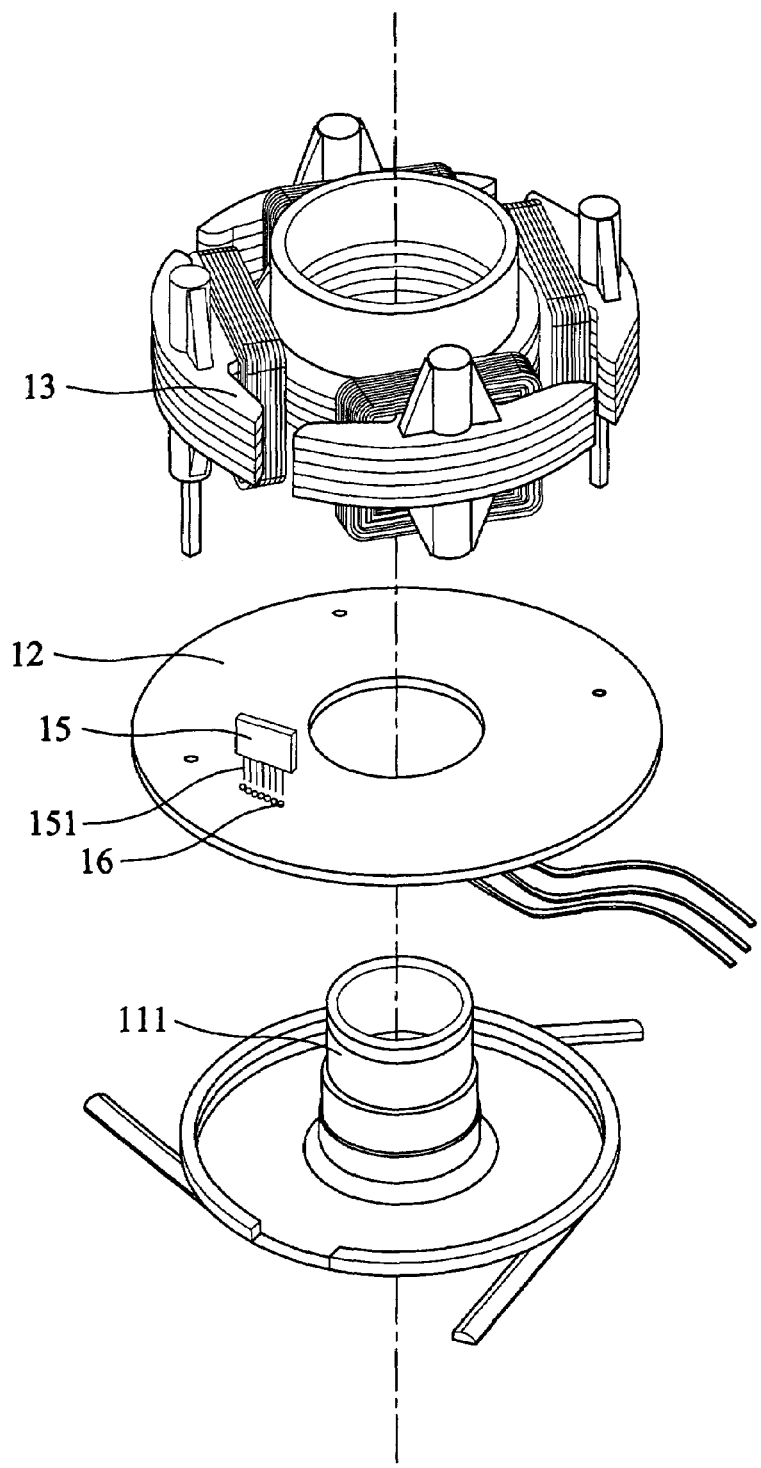
FIG. 1B is an exploded view of another way for fixing a Hall sensor on a PCB in a conventional DC brushless motor.
Figure 2:
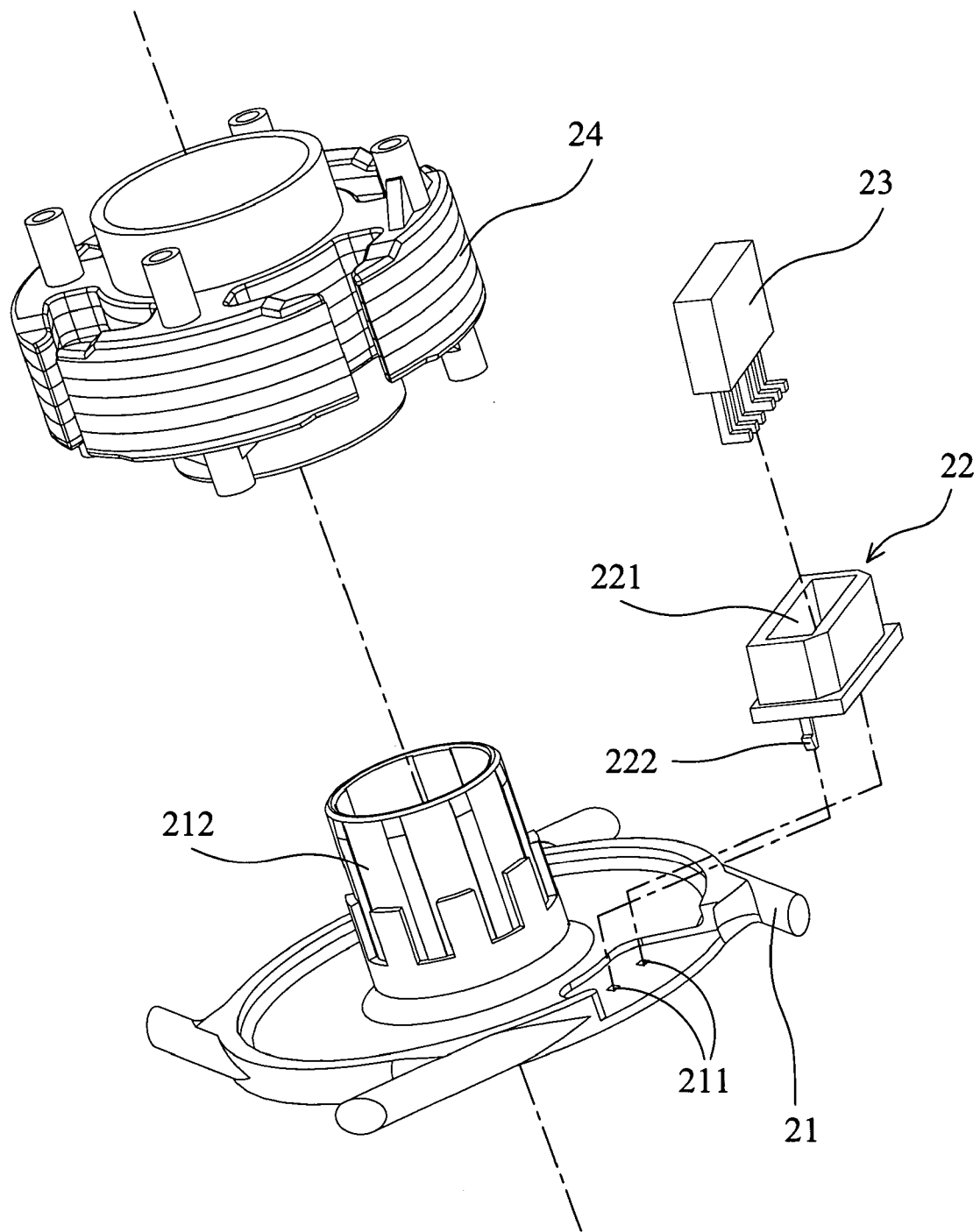
FIG. 2 shows a mounting structure for the motor controller of a DC brushless motor in a first embodiment of the invention.

FIG. 2 shows a mounting structure for the motor controller of a DC brushless motor in a first embodiment of the invention. In FIG. 2, the container 22 is substantially square with a slot 221 in the central portion thereof. The slot 221 can be shaped according to the profile and size of the motor controller 23 to contain the motor controller 23 therein. The container 22 has two hooks 222 on the either side of the bottom surface to engage holes 211 on the chassis 21, so as to fix the container 22 thereon. Alternatively, the container 22 can also be adhered to the chassis 21.

After the stator 24 is assembled on the sleeve 212 of the chassis 21, the relative position of the stator 24 and the motor controller 23 contained in the container 22 can be determined. Thus, through such a mounting design, the relative position between the motor controller 23 and the stator 24 will not be shifted due to the collision from an external force.

Figure 3:
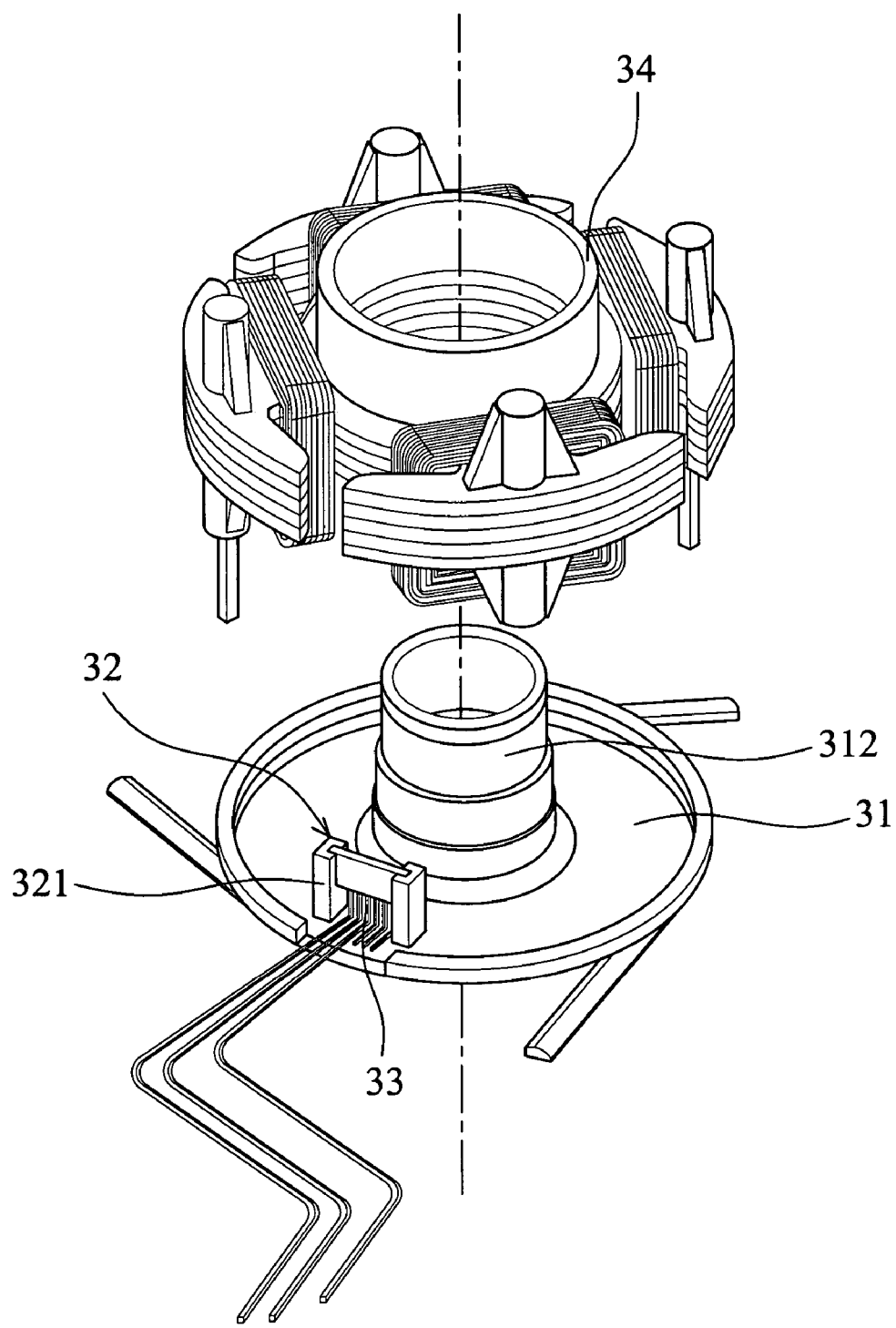
FIG. 3 shows a mounting structure for the motor controller of a DC brushless motor in a second embodiment of the invention.

FIG. 3 shows another mounting structure for the motor controller of a DC brushless motor according the present invention. In FIG. 3, the container 32 is formed by a pair of positioning pillars 321 respectively having U-shaped cross sections, separated according to the profile of the motor controller 33, allowing the motor controller 33 to be assembled therebetween. The positioning pillars 321 can be mounted on, adhered to, or integrally formed on the chassis 31. Similar to the structure shown in FIG. 2, the relative positioning between the stator 34 and the motor controller 33 contained in the container 32 can be determined after the stator 34 is telescoped to the sleeve 312 of the chassis 31.

Figure 4:
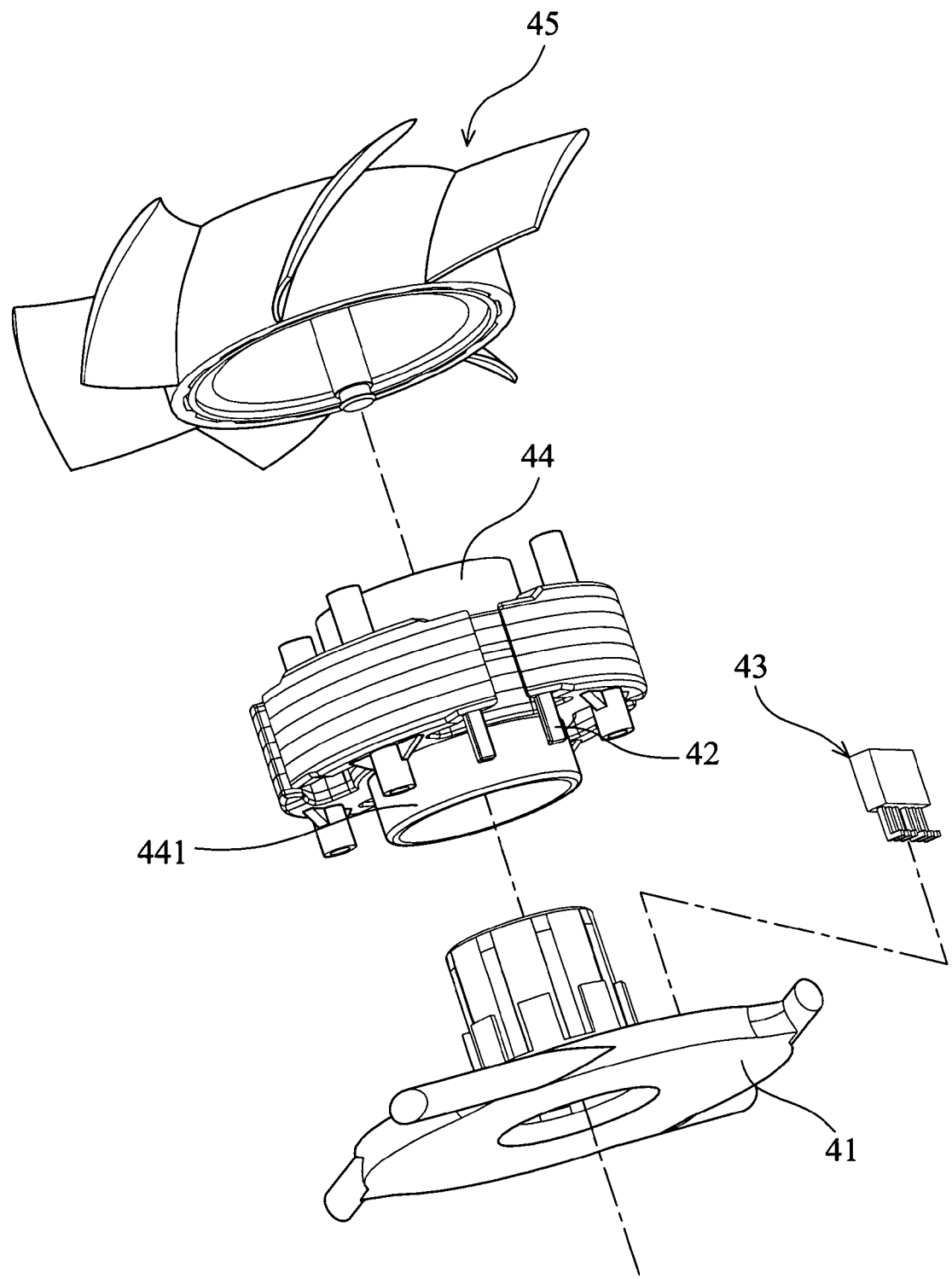
FIG. 4 shows a mounting structure for the motor controller of a DC brushless motor in a third embodiment of the invention.

Another mounting structure for the motor controller is provided in FIG. 4. The stator 44 includes two cover portions 441 and a plurality of stator plates sandwiched therebetween. The container 42 for the motor controller 43 of the third embodiment can be disposed on a cover portion 441 of the stator 44. Furthermore, the container of this structure includes two positioning pillars 42 similar to those in FIG. 3, disposed on the lower cover portion 441 between two neighboring magnetic poles, allowing assembly of motor controller 43 therebetween. Finally, the rotor 45 and stator 44 are sequentially telescoped to the sleeve 412 of the chassis 41. Thus, the motor controller 43 can detect phase change of the magnetic field and control the motor of the fan.

Figure 5:
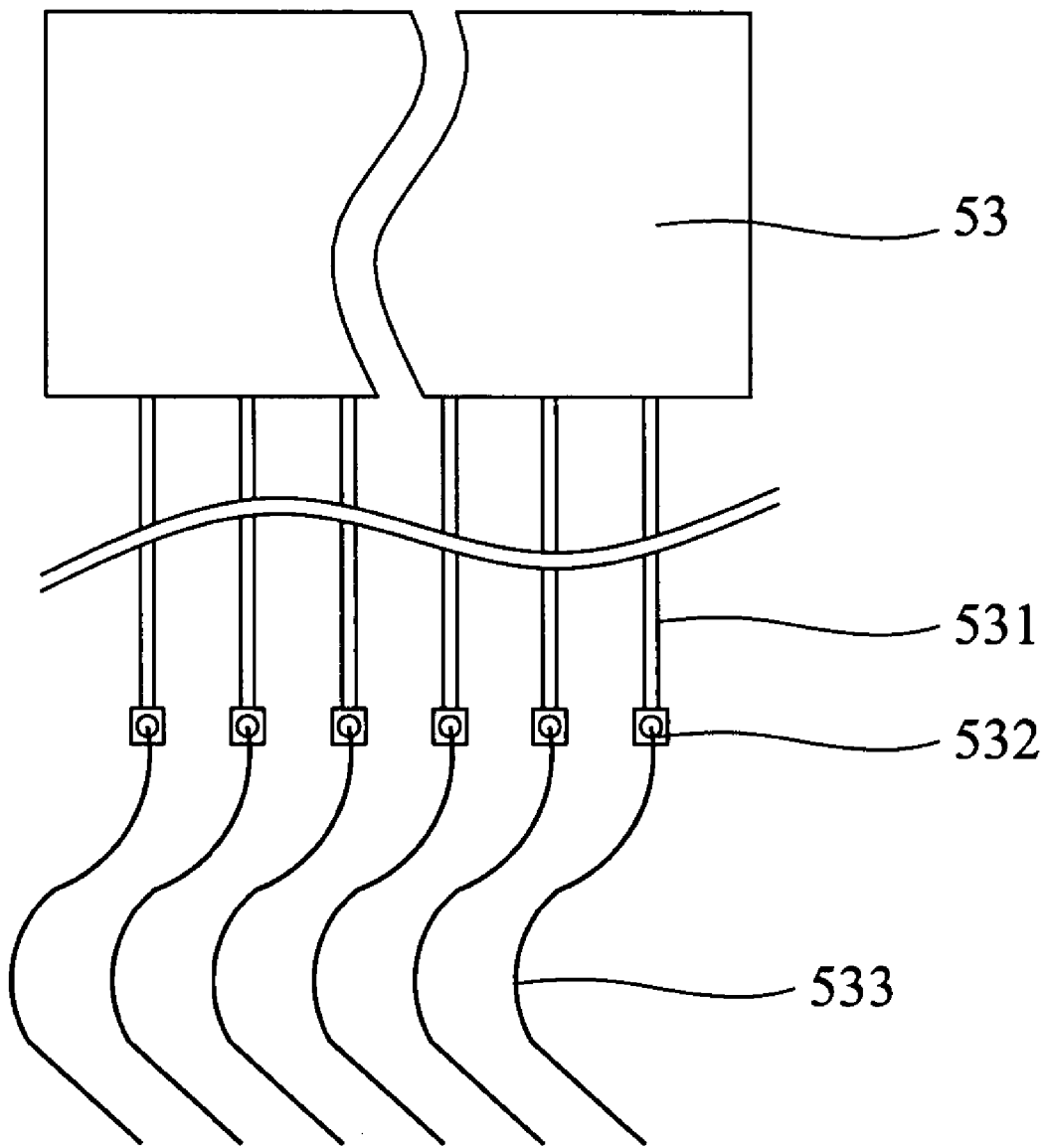
FIG. 5 is a schematic view of the broadened contacts of the motor controller.

The method of connecting the pins of the motor controller and the wires is shown in FIG. 5. The pins 531 of the motor controller 53 can be designed with broadened ends, forming contacts 532 with larger soldering area for the wires 533. Thus, the wires 533 of an external system can be firmly soldered to the contacts 532, forming electrical connections.

Compared to Hall sensors mounting on conventional PCBs, the positions of the motor controller secured in the container and the stator in the invention are precise, preventing additional bending steps, failures during the bending step and eliminating the position shifting between the magnetic poles and the Hall sensors.

Furthermore, the layout area and the number of the elements on the conventional PCB are limited. The complicated layout on the conventional PCB also increases impedance and causes considerable power loss. Moreover, according to the aspect of the present invention, the driving circuit and Hall sensor are integrated as a motor controller (i.e. integrated circuit) utilizing the software to drive and control the rotation of the motor. Thus, a fan with the integrated motor controller of the invention can reduce the number of elements and manufacturing cost and time without needing PCB, lower impedance and increase efficiency of heat-dissipation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat-dissipating device, comprising:
   a chassis;
   a stator disposed on the chassis;
   a rotor surrounding the stator and coupled to the stator;
   a motor controller driving and controlling the heat-dissipating device without circuit boards; and
   a container directly mounted on the chassis and having a slot to receive and directly position the motor controller.

2. The heat-dissipating device as claimed in claim 1, wherein the container is substantially square.

3. The heat-dissipating device as claimed in claim 2, wherein the slot is shaped according to the profile of the motor controller and is formed in the central portion of the container.

4. The container as claimed in claim 2, wherein the motor controller is an integrated circuit to control the heat-dissipating device and detect the phase change of magnetic poles of the stator.

5. The heat-dissipating device as claimed in claim 1, wherein the chassis has a plurality of holes, and the container has a plurality of hooks engaging the holes and securing the container on the chassis.

6. The heat-dissipating device as claimed in claim 1, wherein the container is formed by a plurality of positioning pillars.

7. The heat-dissipating device as claimed in claim 6, wherein the positioning pillars have U-shaped cross sections respectively and are separated according to the profile of the motor controller.

8. The heat-dissipating device as claimed in claim 1, wherein the container is mounted on, adhered to, or integrally formed on the chassis.

9. The heat-dissipating device as claimed in claim 1, wherein the motor controller has a plurality of pins with broadened contacts to which a plurality of wires of an external device are connected.

10. A heat-dissipating device, comprising:
    a chassis;
    a stator disposed on the chassis;
    a rotor surrounding the stator and coupled to the stator;
    a motor controller driving and controlling the heat-dissipating device without circuit boards; and a container directly mounted on and protruding from the stator and having a slot to directly secure the motor controller.

11. The heat-dissipating device as claimed in claim 10, wherein the stator has a cover portion, and the container is mounted thereon.

12. The heat-dissipating device as claimed in claim 11, wherein the container is formed by a plurality of positioning pillars disposed on the cover portion.

13. The heat-dissipating device as claimed in claim 12, wherein the positioning pillars have U-shaped cross sections respectively and are separated according to the profile of the motor controller.

14. The heat-dissipating device as claimed in claim 11, wherein the container is mounted on, adhered to, or integrally formed on the cover portion.

15. The heat-dissipating device as claimed in claim 10, wherein the motor controller has a plurality of pins with broadened contacts to which a plurality of wires of an external device are connected.

16. The heat-dissipating device as claimed in claim 10, wherein the motor controller is an integrated circuit to control the heat-dissipating device and detect the phase change of magnetic poles of the stator.

* * * * *